US012669642B2

(12) United States Patent
Lovelady et al.

(10) Patent No.: US 12,669,642 B2
(45) Date of Patent: Jun. 30, 2026

(54) SELECTIVE NUMERICAL APERTURE CLADDING LIGHT STRIPPER

(71) Applicant: Lumentum Operations LLC, San Jose, CA (US)

(72) Inventors: Michael Lovelady, Mountain View, CA (US); Richard D. Faulhaber, San Carlos, CA (US); Jeff Gregg, San Jose, CA (US)

(73) Assignee: Lumentum Operations LLC, San Jose, CA (US)

( * ) Notice: Subject to any disclaimer, the term of this patent is extended or adjusted under 35 U.S.C. 154(b) by 326 days.

(21) Appl. No.: 18/478,441

(22) Filed: Sep. 29, 2023

(65) Prior Publication Data

US 2025/0004195 A1 Jan. 2, 2025

Related U.S. Application Data

(60) Provisional application No. 63/510,844, filed on Jun. 28, 2023.

(51) Int. Cl.
| | |
|---|---|
| *G02B 6/02* | (2006.01) |
| *G02B 6/028* | (2006.01) |
| *G02B 6/036* | (2006.01) |

(52) U.S. Cl.
CPC ....... *G02B 6/0283* (2013.01); *G02B 6/03688* (2013.01)

(58) Field of Classification Search
CPC .......................... G02B 6/0283; G02B 6/03688
USPC ......................................................... 385/124
See application file for complete search history.

(56) References Cited

U.S. PATENT DOCUMENTS

| | | | |
|---|---|---|---|
| 10,090,631 B2 | 10/2018 | Hou et al. | |
| 2018/0267233 A1* | 9/2018 | Bansal | .............. G02B 6/02052 |
| 2023/0106619 A1* | 4/2023 | Farrow | .................. G02B 6/262 |
| | | | 385/43 |

FOREIGN PATENT DOCUMENTS

| | | |
|---|---|---|
| CN | 105449499 A | 3/2016 |
| CN | 106019476 A | 10/2016 |

OTHER PUBLICATIONS

Ping Yan, et al.; "Kilowatt-level cladding light stripper for high-power fiber laser"; Applied Optics; Mar. 2017; vol. 56 No. 7; pp. 1935-1939; DOI: 10.1364/AO.56.001935; https://www.researchgate.net/publication/314103818_Kilowatt-level_cladding_light_stripper_for_high-power_fiber_laser.

* cited by examiner

*Primary Examiner* — Jerry M Blevins

(57) ABSTRACT

In some implementations, a cladding light stripper includes an optical fiber that includes a core and an exterior cladding, and a light removal component. The exterior cladding of the optical fiber circumferentially surrounds the core of the optical fiber. The exterior cladding includes a first portion, a second portion, and an intermediate portion disposed between the first portion and the second portion. The intermediate portion is bidirectionally tapered. The light removal component is disposed on one or more regions of a central section of the intermediate portion.

20 Claims, 6 Drawing Sheets

SELECTIVE NUMERICAL APERTURE CLADDING LIGHT STRIPPER

CROSS-REFERENCE TO RELATED APPLICATION

This patent application claims priority to U.S. Provisional Patent Application No. 63/510,844, filed on Jun. 28, 2023, and entitled "SELECTIVE NUMERICAL APERTURE CLADDING LIGHT STRIPPER." The disclosure of the prior Application is considered part of and is incorporated by reference into this patent application.

TECHNICAL FIELD

The present disclosure relates generally to a cladding light stripper and to selective numerical aperture cladding light stripper.

BACKGROUND

An optical fiber can include a core, which carries light, and a cladding, which surrounds the core and is configured to confine the light within the core. A cladding light stripper is used to remove or extract light that is in the cladding of the optical fiber.

SUMMARY

In some implementations, a cladding light stripper includes an optical fiber that includes a core and an exterior cladding; and a light removal component, wherein: the exterior cladding of the optical fiber circumferentially surrounds the core of the optical fiber, the exterior cladding includes a first portion, a second portion, and an intermediate portion disposed between the first portion and the second portion, the intermediate portion is bidirectionally tapered, and the light removal component is disposed on one or more regions of a central section of the intermediate portion.

In some implementations, a cladding light stripper includes an optical fiber; and a light removal component, wherein: an exterior cladding of the optical fiber surrounds a core of the optical fiber, the exterior cladding includes a first portion, a second portion, and an intermediate portion disposed between the first portion and the second portion, the intermediate portion includes a first section that is tapered and a second section that is reverse-tapered, and a central section disposed between the first portion and the second portion, and the light removal component is disposed on one or more regions of the central section of the intermediate portion.

In some implementations, a cladding light stripper includes an optical fiber; and a light removal component, wherein: an intermediate portion of an exterior cladding of the optical fiber includes a first section that is tapered and a second section that is reverse-tapered, and the light removal component is disposed on one or more regions of a non-tapered section of the intermediate portion.

DETAILED DESCRIPTION

Figure 1A:
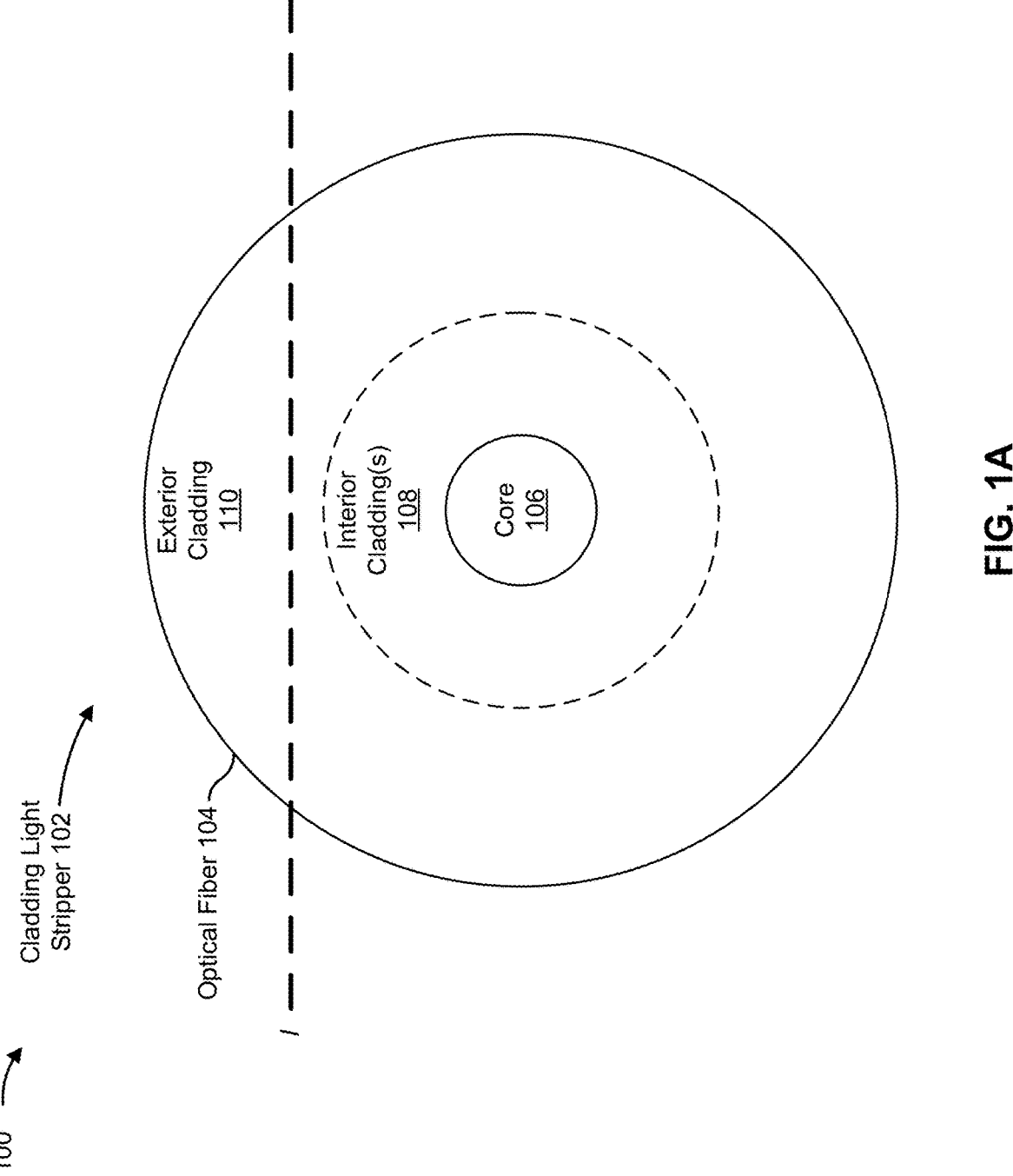
FIGS. 1A-1C are diagrams of an example implementation described herein.

The following detailed description of example implementations refers to the accompanying drawings. The same reference numbers in different drawings may identify the same or similar elements.

In many cases, such as for high-power (e.g., kilowatt class, or greater) applications, a laser can include an optical fiber that includes a polymeric coating (e.g., that circumferentially surrounds a cladding of the optical fiber). The polymeric coating can have a low refractive index to guide light (e.g., cladding light) within the cladding of the optical fiber (e.g., in addition to core light that propagates within a core of the optical fiber). Because of a low melting point, the polymeric coating is often considered to be a weak point in the construction and operation of high-power lasers. For example, a packing process to form a high-power laser can cause an optical fiber to be manipulated (e.g., bent or twisted) such that high-power light that propagates via the optical fiber then leaks out of a cladding of the optical fiber in an uncontrolled manner. This leaked high-power light then overheats the polymeric coating of the optical fiber, which degrades a performance of the optical fiber (and the high-power laser that includes the optical fiber), and leads to failure of the optical fiber (and the high-power laser). Consequently, there is a need to mitigate and/or manage leaked cladding light from an optical fiber, especially for high-power applications.

A cladding light stripper can remove excess and/or unwanted cladding light (e.g., that leaks from a cladding of an optical fiber) in a controlled manner. For example, a cladding light stripper can be formed by patterning or etching the bare glass of a cladding of an optical fiber, or recoating the optical fiber with a polymer, a ceramic, or glass. When forming a cladding light stripper, it is often desirable to target and remove a particular portion of light that propagates via an optical fiber (e.g., that would otherwise leak from a cladding of the optical fiber). However, limitations on current cladding light stripper formation techniques and available materials (e.g., due to discrete numerical apertures (NAs) of the materials) for forming cladding light strippers often allow too much or too little light to be removed from the optical fiber. In particular, cladding light strippers cannot be reliably formed to remove cladding light that is associated with NAs that are greater than a particular NA (e.g., a selected NA), especially when the particular NA is different than that of respective materials that can be used to form the cladding light strippers.

As used herein, a component (or a material of the component) may be described as "having an NA" or "with an NA." This refers to a property of an interface between the component and another component (e.g., comprising another material) (or air), and is based on respective refractive indices of the component and the other component (or air). The NA of the component characterizes a range of angles over which the interface reflects or transmit light. In a specific example, for fiber optics, an NA of an optical fiber describes a range of angles within which light incident within the optical fiber is transmitted along the optical fiber (e.g., within the optical fiber), instead of leaking out of the optical fiber. When a component is described as having an X NA, the maximum NA that the component can support is X (e.g., to allow total internal reflection within the component). Additionally, as used herein, light (e.g., cladding light) may be described as "having an NA," which characterizes a range of angles at which the light propagates (e.g., through an optical fiber). When the light describes as having a Y NA, the maximum NA of the light is Y.

Some implementations described herein include a selective NA cladding light stripper, which may be formed by manipulation of dimensions of an exterior cladding of an optical fiber of the cladding light stripper (e.g., by bidirectionally tapering a portion of the exterior cladding) and by including a light removal component (e.g., disposed on the portion of the exterior cladding). By combining selective manipulation of the dimensions of the exterior cladding, in conjunction with selection of a material with a particular NA to be included in the light removal component, cladding light associated with one or more particular NAs (e.g., that is greater than a maximum selected NA) may be removed (e.g., by the light removal component). In this way, some implementations allow for selective stripping of a specific range of NAs of unwanted cladding light from the optical fiber.

In an example, the cladding light stripper includes an optical fiber and a light removal component. The optical fiber has a core and an exterior cladding, where the exterior cladding circumferentially surrounds the core. The exterior cladding includes a first portion, a second portion, and an intermediate portion disposed between the first portion and the second portion along a length of the cladding light stripper. The intermediate portion includes a first section, a second section, and a central section disposed between the first section and the second section. The light removal component is disposed on one or more regions of the central section of the intermediate portion.

The intermediate portion is bidirectionally tapered. For example, the first section is tapered according to a first taper ratio and the second section is reverse-tapered according to a second taper ratio. The central section is not tapered. The first taper ratio may match the second taper ratio (e.g., the first taper ratio and the second taper ratio may be equal to each other, within a tolerance, but may be in opposite directions). In some implementations, each of the first section and the second section may be adiabatically tapered. Notably, at least one of the first section or the second section may be tapered (or reverse-tapered) according to a taper ratio that is associated with an NA of the light removal component (e.g., an NA of a material comprising the light removal component). For example, the taper ratio may be equal to a maximum selected NA (e.g., for cladding light that propagates via the intermediate portion) divided by the NA of the light removal component.

In this way, the light removal component is enabled to remove, or "strip," cladding light that is associated with NAs that are greater than the maximum selected NA from the cladding light stripper. For example, cladding light that propagates from the first portion of the exterior cladding to the first section of the intermediate portion of the exterior cladding may have an NA distribution, where a portion of the cladding light is associated with NAs that are greater than the maximum selected NA. The first section (e.g., due to being tapered according to the first taper ratio) is configured to change the NA distribution of the cladding light as the cladding light propagates via the first section to the central section of the intermediate portion. Therefore first section causes the portion of the cladding light to be associated with NAs that are greater than the NA of the light removal component. Accordingly, the light removal component (e.g., due to the NA of the light removal component and due to the light removal component being disposed on the one or more regions of the central section) is configured to remove the portion of the cladding light (e.g., that is associated with NAs that are greater than the NA of the light removal component) as the cladding light propagates through the central section of the intermediate portion to the second section of the intermediate portion. The second section (e.g., due to being reverse-tapered according to the second taper ratio) is configured to change the NA distribution of the cladding light (e.g., to "revert back" the NA distribution of the cladding light) as the cladding light propagates via the second section (e.g., to the second portion of the exterior cladding of the cladding light stripper). Therefore the second section causes a maximum NA of the cladding light (e.g., after removal of the portion of the cladding light by the light removal component) to be less than or equal to the maximum selected NA.

After the cladding light propagates from the second section of the intermediate portion, the cladding light may exit the cladding light stripper (e.g., via an output end of the cladding light stripper associated with the second portion of the exterior cladding of the cladding light stripper). For example, the optical fiber, at a splice point associated with the output end of the cladding light stripper, may be spliced to an output fiber, and the maximum selected NA can be selected to prevent, or to minimize, leakage of the cladding light when propagating from the optical fiber of the cladding light stripper via the splice point to the output fiber. When used in a high-power application, this reduces a likelihood that high-power cladding light leaks (e.g., in a region associated with the splice point) and overheats a polymeric coating of the output fiber. This therefore improves a performance of the optical output fiber, and reduces a likelihood of failure of the output fiber. This thereby improves a performance of a laser that includes the cladding light stripper and the output fiber, and reduces a likelihood of failure of the laser.

Figure 1B:
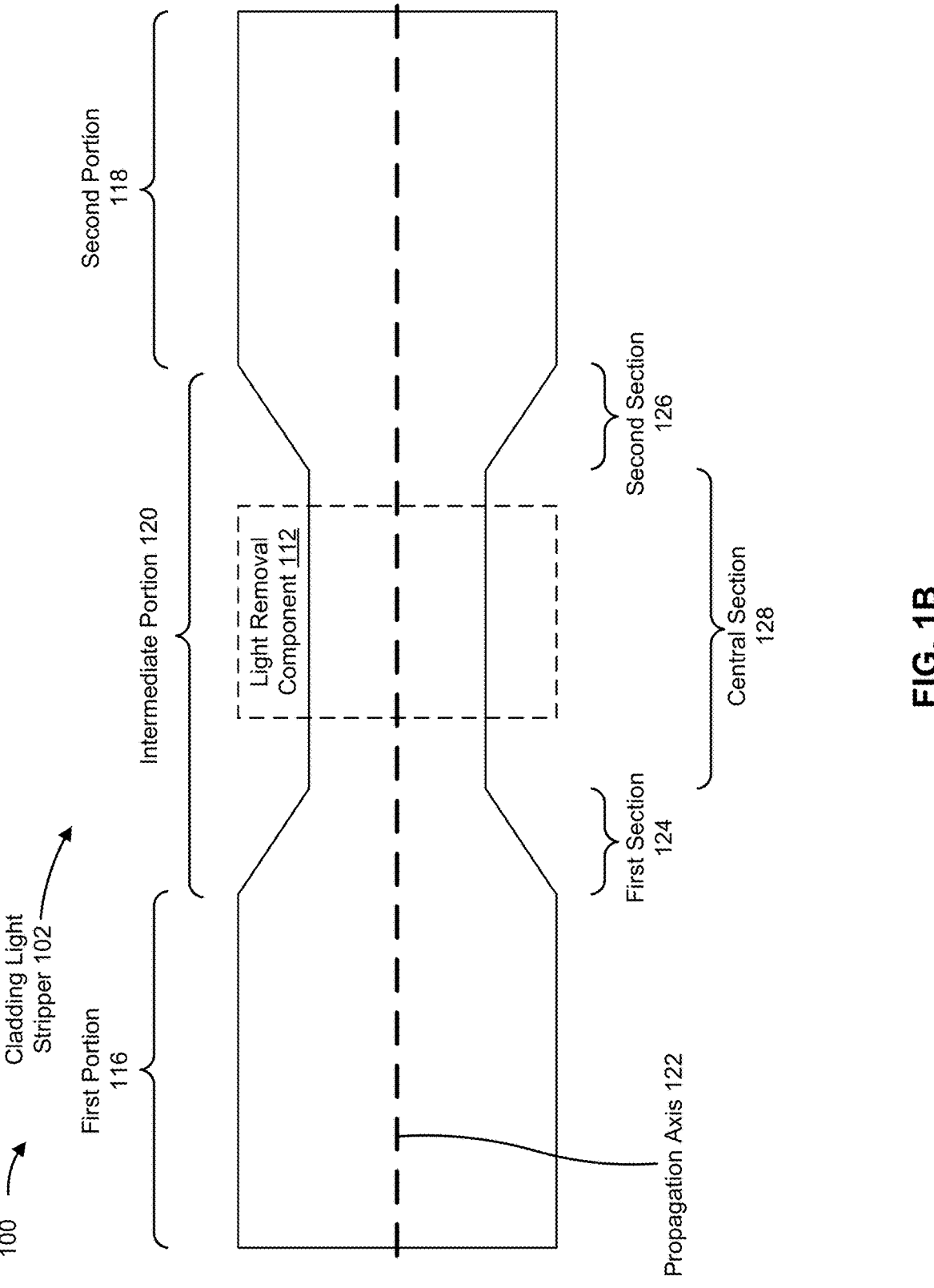
Figure 1C:
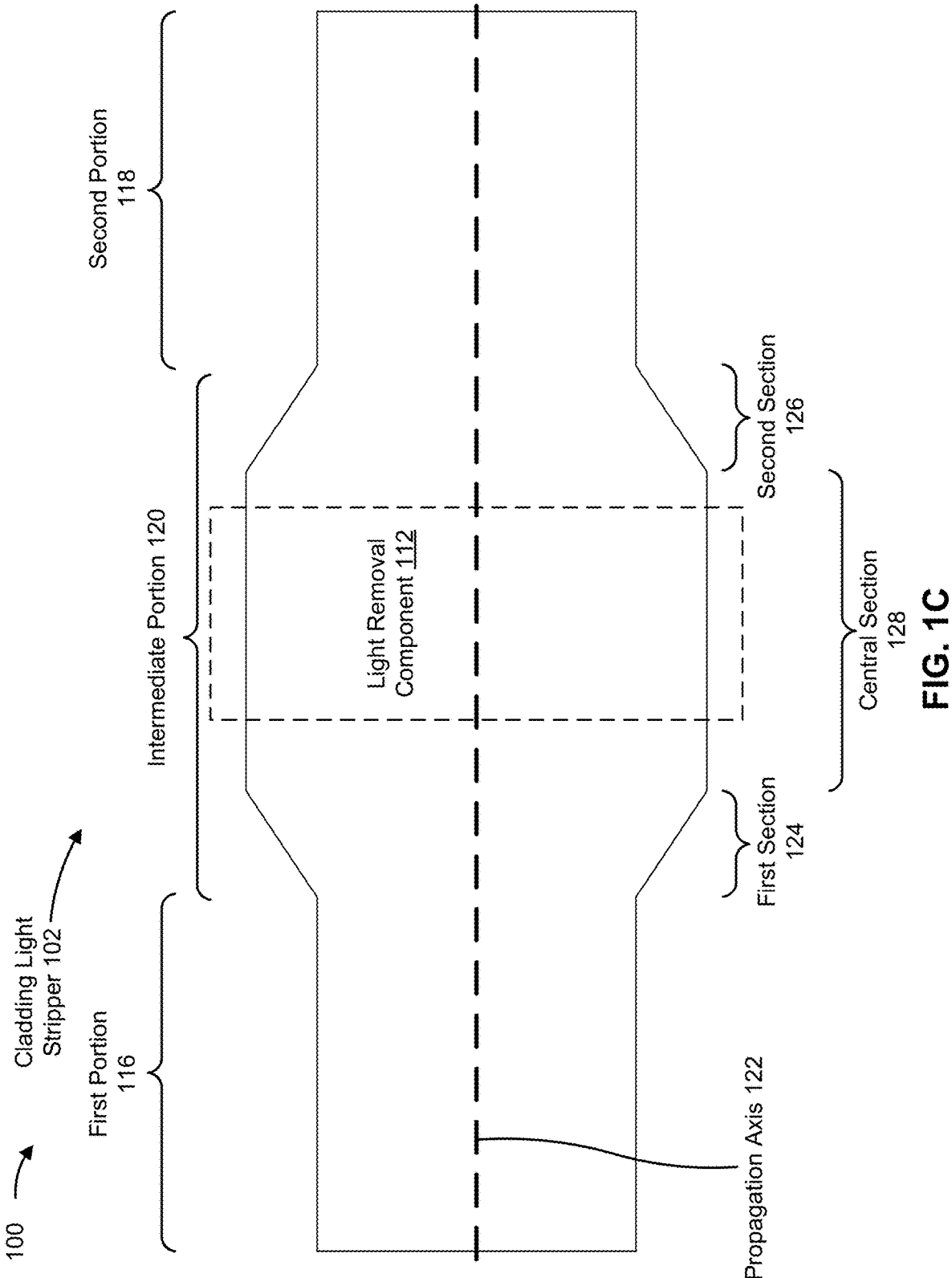

FIGS. 1A-1C are diagrams of an example implementation 100 described herein. As shown in FIGS. 1A-1C, the example implementation 100 includes a cladding light stripper 102. The cladding light stripper 102 may include an optical fiber 104, which may include a core 106, an exterior cladding 110 and optionally one or more interior claddings 108. The cladding light stripper 102 may also include a light removal component 112 (shown in FIGS. 1B-1C). FIG. 1A shows a cross-sectional view of the cladding light stripper 102 (e.g., at a first end of the cladding light stripper 102, such as an input end of the cladding light stripper 102), and FIGS. 1B-1C show respective top-down views of different example configurations of the cladding light stripper 102 along a cut I (see FIG. 1A) through the cladding light stripper 102.

As shown in FIG. 1A, the optical fiber 104 may include the core 106 and the exterior cladding 110. In some implementations, the optical fiber 104 may also include the one or more interior claddings 108. As further shown in FIG. 1A, the exterior cladding 110 may surround (e.g., circumferentially surround) the core 106. In some implementations, when the optical fiber 104 includes the one or more interior claddings 108, the exterior cladding 110 may surround the one or more interior claddings 108, and the one or more interior claddings 108 may surround the core 106. Accordingly, the exterior cladding 110 may surround the one or more interior claddings 108 and the core 106.

In some implementations, the optical fiber 104 may be configured to propagate core light (e.g., from an input end of the optical fiber 104 to an output end of the optical fiber 104). For example, the core 106 may be configured to propagate the core light (e.g., within the core 106). The one or more interior claddings 108 and/or the exterior cladding 110 may be configured to confine the core light within the core 106 (e.g., confine the light inward, such as from an inner diameter of an interior cladding 108 of the one or more interior claddings 108, and/or an inner diameter of the exterior cladding 110). The core light may be provided by a core light source (e.g., a laser light source, or another type of light source, not shown in FIGS. 1A-1C).

Additionally, or alternatively, the optical fiber 104 may be configured to propagate cladding light (e.g., from the input end of the optical fiber 104 to the output end of the optical fiber 104). For example, the exterior cladding 110 may be configured to propagate the cladding light (e.g., within the exterior cladding 110). The one or more interior claddings 108 and/or the core 106 may be configured to confine the cladding light within the exterior cladding (e.g., confine the light outward, such as from an outer diameter of an interior cladding 108 of the one or more interior claddings 108, and/or an outer diameter of the core 106). The cladding light may be provided by a cladding light source (e.g., a laser light source, or another type of light source, not shown in FIGS. 1A-1C), or may be "leaked" core light from the core 106 (e.g., core light that did not couple into the core 106 and/or propagated out of the core 106). In some implementations, the one or more interior claddings 108 may be configured to additionally propagate the cladding light (e.g., in addition to the exterior cladding 110), or may be configured to propagate additional cladding light (e.g., that is different than the cladding light).

In some implementations, the optical fiber 104 may comprise glass (e.g., a silica-based glass, a quartz-based glass, a doped glass, or another type of glass). In some implementations, the core 106, the one or more interior claddings 108, and/or the exterior cladding 110 may comprise a same type of glass, such as a silica-based glass. Alternatively, the core 106, the one or more interior claddings 108, and/or the exterior cladding 110 may comprise different types of glass. For example, the core 106 may comprise a doped silica-based glass (e.g., doped with germanium, fluorine, or another dopant) and each of the one or more interior claddings 108 and/or the exterior cladding 110 may comprise an undoped silica-based glass (or vice versa).

FIG. 1B shows a top-down view of an example configuration of the cladding light stripper 102 along the cut 114, which, as shown in FIG. 1A, cuts through the exterior cladding 110. Accordingly, FIG. 1B shows a top-down view of an internal portion of the exterior cladding 110 according to the example configuration.

As shown in FIG. 1B, the exterior cladding 110 may include a first portion 116, a second portion 118, and an intermediate portion 120. The first portion 116 may be associated with a first end of the cladding light stripper 102 (e.g., an input end of the cladding light stripper 102), the second portion 118 may be associated with a second end of the cladding light stripper 102 (e.g., an output end of the cladding light stripper 102), and the intermediate portion 120 may be disposed between the first portion 116 and the second portion 118 and may be associated with an intermediate portion of the cladding light stripper 102 (e.g., that is disposed between the first end and the second end of the cladding light stripper 102). Accordingly, the exterior cladding 110 may extend from the first portion 116, to the intermediate portion 120, and then to the second portion 118, such as along a propagation axis 122 of the cladding light stripper 102 (e.g., a direction in which core light or cladding light propagates through the cladding light stripper 102, such as from the first end of the cladding light stripper 102, to the intermediate portion of the cladding light stripper 102, and then to the second end of the cladding light stripper 102).

As further shown in FIG. 1B, the intermediate portion 120 of the exterior cladding 110 may include a first section 124, a second section 126, and a central section 128 (e.g., that is disposed between the first section 124 and the second section 126). For example, the intermediate portion 120 may extend from the first section 124, to the central section 128, and then to the second section 126, such as along the propagation axis 122 of the cladding light stripper 102.

The intermediate portion 120 may be bidirectionally tapered. For example, the first section 124 may be tapered and the second section 126 may be reverse-tapered (e.g., tapered in an opposite direction of a direction in which the first section 124 is tapered). In a particular example, as shown in FIG. 1B, the first section 124 may be down-tapered and the second section 126 may be up-tapered. The first section 124 may be tapered according to a first taper ratio, and the second section 126 may be reverse-tapered according to a second taper ratio. In some implementations, the first taper ratio may match the second ratio (e.g., the first taper ratio and the second ratio may be equal to each other, within a tolerance, such as 1%, 2%, or 3%, but the tapers are in opposite directions), such as to allow to respective sizes (e.g., respective circumferences, diameters, or other measurements of size) of the first end of the cladding light stripper 102 (e.g., the input end of the cladding light stripper 102 associated with the first portion 116 of the cladding light stripper 102) and of the second end of the cladding light stripper 102 (e.g., the output end of the cladding light stripper 102 associated with the second portion 118 of the cladding light stripper 102) to be the same or similar. Alternatively, the first taper ratio may not match the second taper ratio (e.g., a difference between the first taper ratio and the second ratio may be greater than 3% of the first taper ratio the second portion 118), such as allow to the respective sizes of the first end of the cladding light stripper 102 and of the second end of the cladding light stripper 102 to be different (e.g., to allow a size of the optical fiber 104 at the second end of the cladding light stripper 102 to be the same, or similar, as an output fiber spliced to the optical fiber at a splice point associated with the output end of the cladding light stripper 102).

In some implementations, the first section 124 may be adiabatically tapered (e.g., according to the first taper ratio), and may be referred to as a first adiabatically tapered section 124. Moreover, the second section 126 may be adiabatically tapered (e.g., according to the second taper ratio), and may be referred to as a second adiabatically tapered section 126. The central section 128 may not be tapered (e.g., may not be associated with a taper ratio), and may be referred to as a non-tapered central section 128.

FIG. 1C shows a top-down view of another example configuration of the cladding light stripper 102 along the cut 114, which, as shown in FIG. 1A, cuts through the exterior cladding 110. Accordingly, FIG. 1C shows a top-down view of an internal portion of the exterior cladding 110 according to the other example configuration.

As shown in FIG. 1C, the exterior cladding 110 may include the first portion 116, the second portion 118, and the intermediate portion 120, as described herein in relation to FIG. 1B. Further, the intermediate portion 120 of the exterior cladding 110 may include the first section 124, the second section 126, and the central section 128, as described herein in relation to FIG. 1B.

As further show in FIG. 1C, the intermediate portion 120 may be bidirectionally tapered, such that the first section 124 is tapered and the second section 126 is reverse-tapered. In a particular example, as shown in FIG. 1C, the first section 124 may be up-tapered and the second section 126 may be down-tapered. The first section 124 may be tapered according to a first taper ratio (e.g., that may be different than the first taper ratio described above in relation to FIG. 1B), and the second section 126 may be reverse-tapered according to a second taper ratio (e.g., that may be different than the second taper ratio described above in relation to FIG. 1B). In some implementations, the first taper ratio may match the second taper ratio (e.g., the first taper ratio and the second ratio may be equal to each other, within a tolerance, such as 1%, 2%, or 3%, but the tapers are in opposite directions), such as to allow the respective sizes of the first end of the cladding light stripper 102 and of the second end of the cladding light stripper 102 to be the same or similar. Alternatively, the first taper ratio may not match the second taper ratio (e.g., a difference between the first taper ratio and the second ratio may be greater than 3% of the first taper ratio the second portion 118), such as allow to the respective sizes of the first end of the cladding light stripper 102 and of the second end of the cladding light stripper 102 to be different (e.g., to allow a size of the optical fiber 104 at the second end of the cladding light stripper 102 to be the same, or similar, to an output fiber spliced to the optical fiber at a splice point associated with the output end of the cladding light stripper 102).

In some implementations, the first section 124 may be adiabatically tapered (e.g., according to the first taper ratio), and may be referred to as a first adiabatically tapered section 124. Moreover, the second section 126 may be adiabatically tapered (e.g., according to the second taper ratio), and may be referred to as a second adiabatically tapered section 126. The central section 128 may not be tapered (e.g., may not be associated with a taper ratio), and may be referred to as a non-tapered central section 128.

Although FIGS. 1B and 1C, show that the intermediate portion 120 may be bidirectionally tapered, the intermediate portion 120 may be tapered in other ways. For example, the first section 124 and the second section 126 may each be tapered in a same direction (e.g., each maybe up-tapered or down-tapered). That is, the first section 124 may be tapered according to a first taper ratio, and the second section 126 may be tapered according to a second taper ratio, where the first taper ratio may match, or, alternatively many not match, the second taper ratio.

Further, a portion of the core 106 that is associated with the intermediate portion 120 of the exterior cladding 110 (e.g., that is surrounded by the intermediate portion 120) may be tapered in a same or similar manner as the intermediate portion 120 is tapered. For example, the portion of the core 106 may include a first section and a second section that are respectively tapered in same, or similar, manner as the first section 124 and the second section 126 (e.g., with the same or similar respective taper ratios), and may include a central section (e.g., disposed between the first section and the second section) that is not tapered. Alternatively, the portion of the core 106 that is associated with the intermediate portion 120 of the exterior cladding 110 may not be tapered (e.g., may have a consistent circumference and/or diameter) along the length of the intermediate portion 120 of the exterior cladding 110.

As shown in FIGS. 1B and 1C, and indicated by the dashed box, the light removal component 112 may be disposed on (e.g., may directly contact) the exterior cladding 110 (e.g., an external surface of the exterior cladding 110) of the optical fiber 104 of the cladding light stripper 102. The light removal component 112 may be disposed on one or more regions of the central section 128 of the intermediate portion 120. For example, as shown in FIGS. 1B and 1C, the light removal component 112 may be disposed on a single region of the central section 128.

The light removal component 112 may comprise glass (e.g., a silica-based glass, a quartz-based glass, a doped glass, or another type of glass). Accordingly, the light removal component 112 may have a numerical aperture (NA) (e.g., a material that comprises the light removal component 112 may have an NA). The NA of the light removal component 112 may be selected, and/or configured, to allow the light removal component 112 to remove, or "strip," cladding light with an NA greater than the NA of the light removal component 112 from the one or more regions of the central section 128 of the intermediate portion 120 of the exterior cladding 110 on which the light removal component 112 is disposed, as further described herein.

In some implementations, a tapered section of the exterior cladding 110 (e.g., the first section 124 and/or the second section 126) may be tapered (or reverse-tapered) according to a taper ratio that is associated with the NA of the light removal component 112. For example, the taper ratio may be described using the following formula: $TR=NA_{selected}/NA_{LRC}$, where TR represents the taper ratio, $NA_{selected}$ represents a selected NA (e.g., a maximum selected NA) for cladding light that propagates via the intermediate portion 120 of the exterior cladding 110, and $NA_{LRC}$ represents an NA of the light removal component 112 (e.g., an NA of a material that comprises the light removal component 112). That is, the taper ratio may be equal to the maximum selected NA divided by the NA of the light removal component 112 (or may be equal to a constant value, or another value, multiplied by the maximum selected NA divided by the NA of the light removal component 112). In this way, the section may be configured to change an NA distribution of cladding light that propagates through the section, as further described herein.

As described above, with reference to FIG. 1A, the optical fiber 104 may be configured to propagate cladding light (e.g., from the input end of the optical fiber 104 to the output end of the optical fiber 104), such as within the exterior cladding 110. Moreover, with reference to FIGS. 1B and 1C, the first portion 116 may be configured to propagate the cladding light to the first section 124 (e.g., the first adiabatically tapered section 124) of the intermediate portion 120.

The first section 124 may be configured to change an NA distribution of the cladding light (e.g., based on the first taper ratio of the first section 124). For example, the first section 124 may cause a portion of the cladding light that is associated with NAs that are greater than $NA_{selected}$ (e.g., the maximum selected NA for the cladding light) to be associated with NAs that are greater than $NA_{LRC}$ (e.g., the NA of the light removal component 112). Further, the first section 124 may be configured to propagate the cladding light to the central section 128 (e.g., the non-tapered central section 128) of the intermediate portion 120.

The central section 128 may be configured to propagate the cladding light to the second section 126 (e.g., the second adiabatically tapered section 126). Additionally, the light removal component 112, when disposed on the one or more regions of the central section 128, may be configured to remove greater than a threshold percentage of the portion of the cladding light (e.g., the portion of the cladding light that is associated with a range of the NA distribution that, due to the first taper ratio of the first section 124, includes NAs that are greater than $NA_{LRC}$), as the cladding light propagates to the second section 126. The threshold percentage may be, for example, greater than or equal to 99%, 99.5%, 99.6%, 99.7%, 99.8%, or 99.9%

The second section 126 may be configured to change the NA distribution of the cladding light (e.g., based on the second taper ratio of the second section 126). For example, the second section 126 may cause the range of the NA distribution of the cladding light (e.g., that no longer includes the greater than the threshold percentage of the portion of the cladding light that was removed by the light removal component 112) to include NAs that are less than or equal to $NA_{selected}$ (e.g., the maximum selected NA for the cladding light). Accordingly, a maximum NA of a threshold percentage of the cladding light (e.g., wherein the threshold percentage is greater than or equal to 99%, 99.5%, 99.6%, 99.7%, 99.8%, or 99.9%), after the NA distribution is changed by the second section 126, is less than or equal to $NA_{selected}$.

Further, the second section 126 may be configured to propagate the cladding light to the second portion 118 of the exterior cladding 110, which may be configured to propagate the cladding light to the output end of the optical fiber 104. The cladding light may then propagate to an output fiber (e.g., at a splice point associated with the output end of the cladding light stripper 102).

In this way, a maximum NA associated with a threshold percentage of the cladding light within the first portion 116 of the exterior cladding 110 of the optical fiber 104 of the cladding light stripper 102 is greater than $NA_{selected}$, and a maximum NA associated with the threshold percentage of the cladding light within the second portion 118 of the exterior cladding 110 of the optical fiber 104 of the cladding light stripper 102 is less than or equal to $NA_{selected}$. Further, a maximum NA associated with the cladding light at the input end of the cladding light stripper 102 is greater than $NA_{selected}$, and a maximum NA associated with the threshold percentage of the cladding light at the output end of the cladding light stripper is less than or equal to $NA_{selected}$.

FIGS. 1A-1C are provided as an example. Other examples may differ from what is described with regard to FIGS. 1A-1C.

Figure 2A:
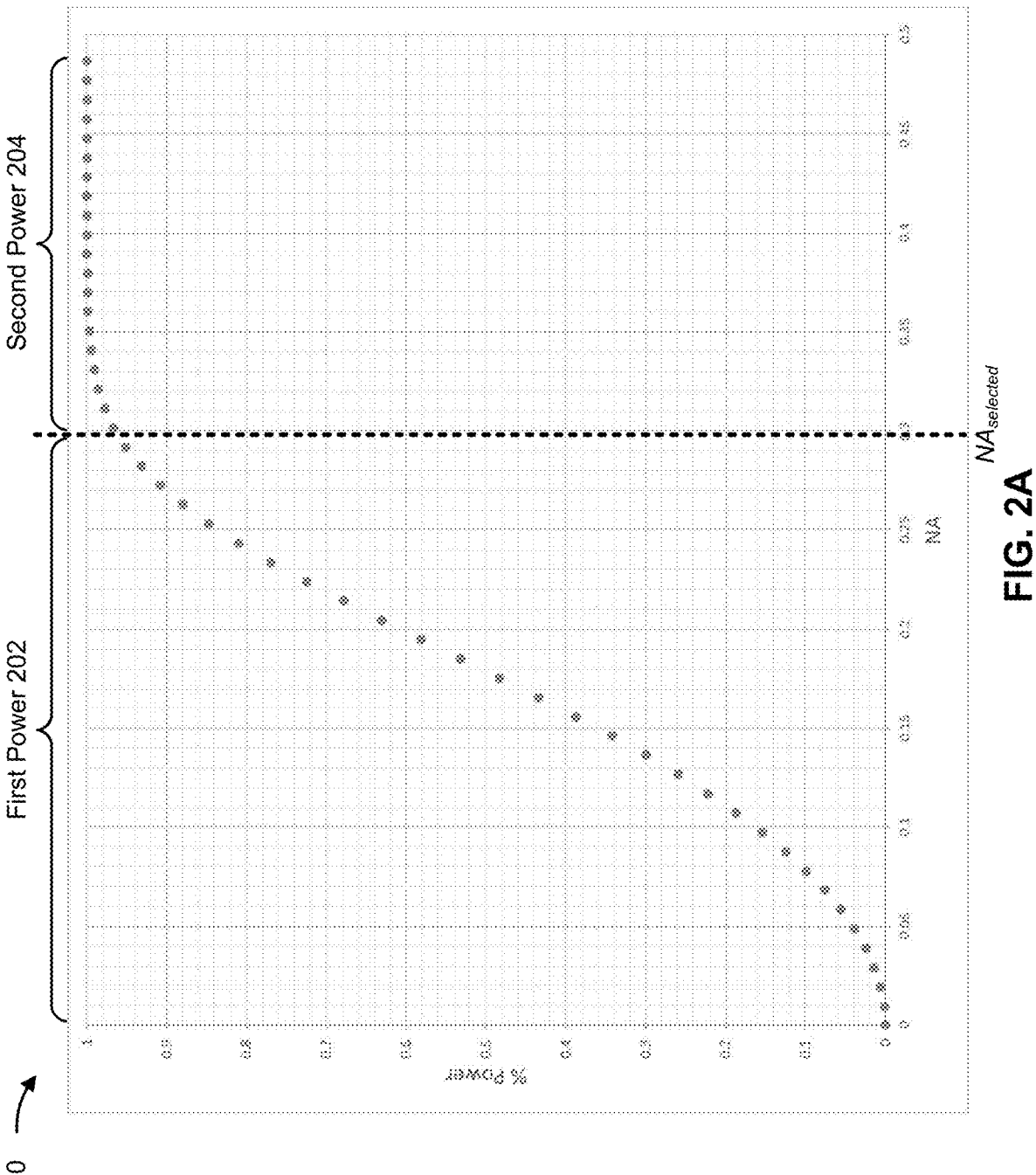
FIGS. 2A-2C are plots of an example numerical aperture distribution of cladding light at different points of an exterior cladding of an optical fiber of a cladding light stripper described herein.
Figure 2B:
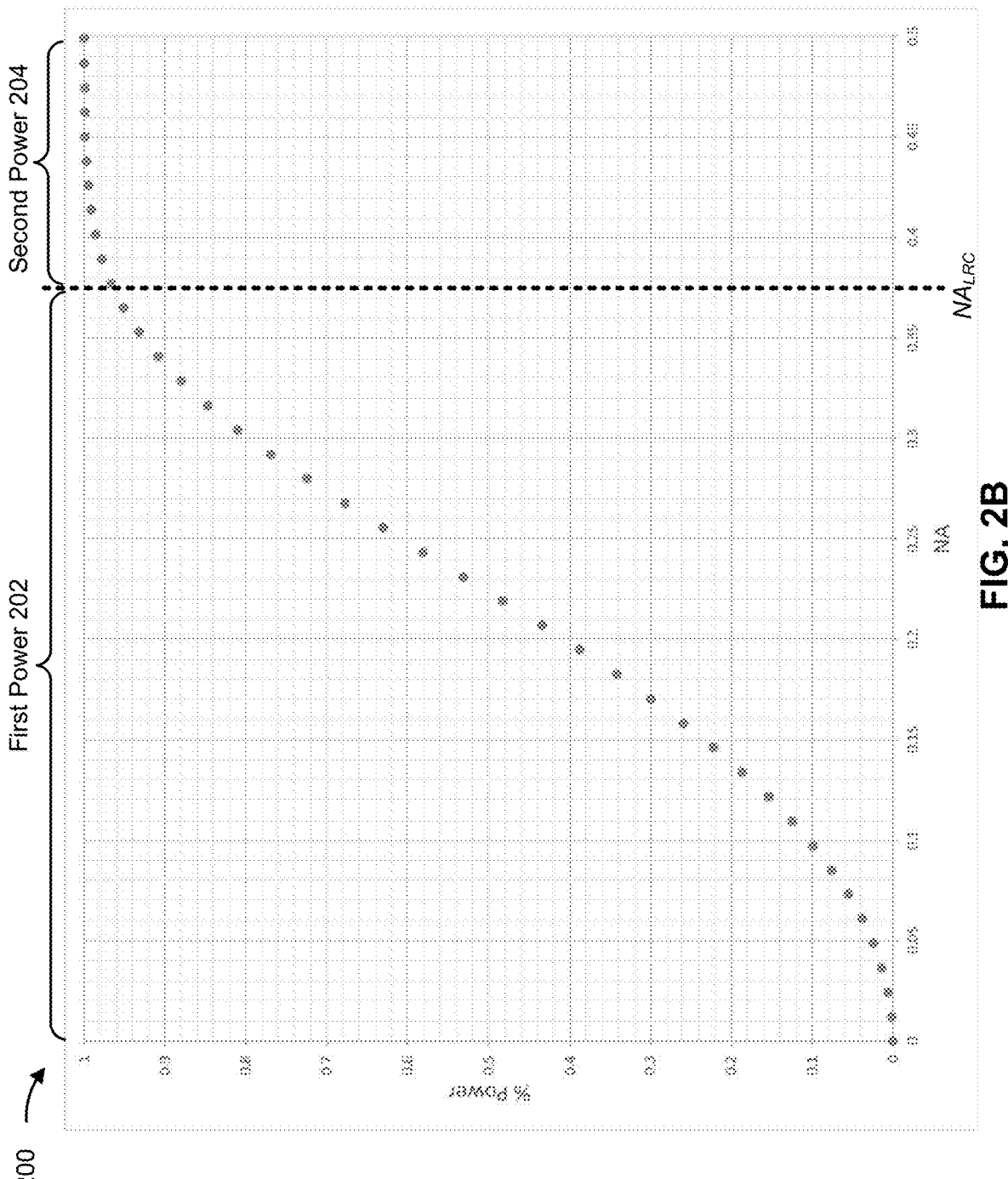
Figure 2C:
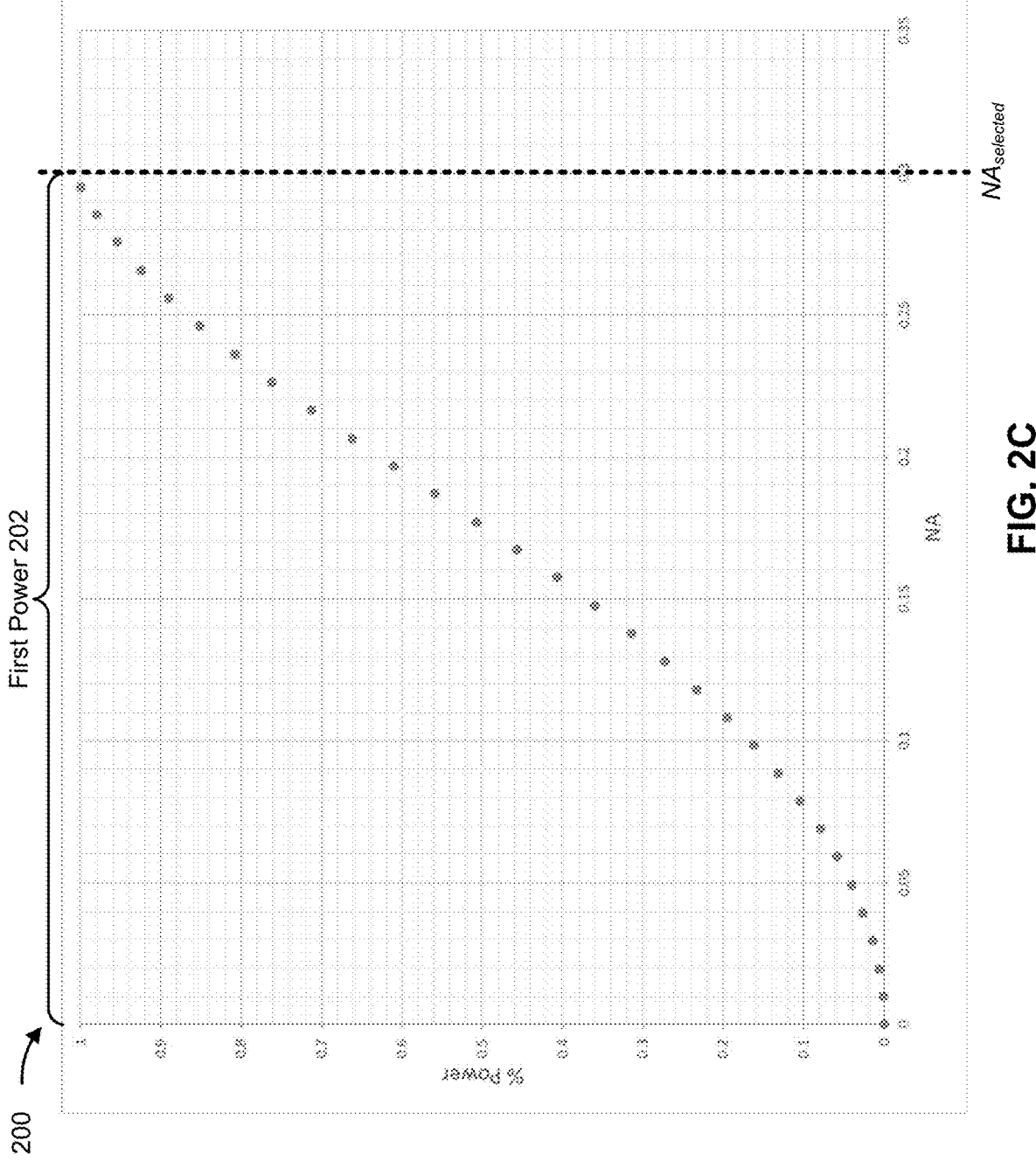

FIGS. 2A-2C are plots 200 of an example NA distribution of cladding light at different points of an exterior cladding (e.g., the exterior cladding 110) of an optical fiber (e.g., the optical fiber 104) of a cladding light stripper (e.g., the cladding light stripper 102) described herein.

FIG. 2A shows a plot of an example NA distribution of cladding light in a first portion (e.g., the first portion 116) of the exterior cladding of the optical fiber of the cladding light stripper. As shown in FIG. 2A, the NA distribution of the cladding light is from 0 to 0.48 (e.g., greater than 0 and less than or equal to 0.48). A first power 202 of the cladding light is associated with a first range of the NA distribution that includes NAs that are less than or equal to a maximum selected NA for the cladding light (shown as $NA_{selected}$, and equal to 0.3). A second power 204 of the cladding light is associated with a second range of the NA distribution that includes NAs that are greater than the maximum selected NA (e.g., $NA_{selected}$) for the cladding light.

FIG. 2B shows a plot of the example NA distribution of the cladding light in an intermediate portion (e.g., the intermediate portion 120) of the exterior cladding of the optical fiber of the cladding light stripper. For example, the example NA distribution of the cladding may have been changed by a first section (e.g., the first section 124) of the intermediate portion, such as in a similar manner as that described herein with reference to FIGS. 1A-1C. As shown in FIG. 2B, the NA distribution of the cladding light is from 0 to 0.5 (e.g., greater than 0 and less than or equal to 0.5). The first power 202 of the cladding light has been changed to be associated with a third range of the NA distribution that includes NAs that are less than or equal to an NA of a light removal component (e.g., the light removal component 112) of the cladding light stripper (shown as $NA_{LRC}$, and equal to 0.37). The second power 204 of the cladding light has been changed to be associated with a fourth range of the NA distribution that includes NAs that are greater than the NA of the light removal component 112 (e.g., $NA_{LRC}$).

FIG. 2C shows a plot of the example NA distribution of the cladding light in a second portion (e.g., the second portion 118) of the exterior cladding of the optical fiber of the cladding light stripper. For example, the example NA distribution of the cladding may have been changed by a second section (e.g., the second section 126) of the intermediate portion, such as in a similar manner as that described herein with reference to FIGS. 1A-1C. As shown in FIG. 2C, the NA distribution of the cladding light is from 0 to 0.3 (e.g., greater than 0 and less than or equal to 0.3) and only includes the first power 202 of the cladding light (e.g., that has been changed, again, to be associated with the first range that includes NAs that are less than or equal to the maximum selected NA for the cladding light (e.g., $NA_{selected}$). Accordingly, as shown in FIG. 2C, only cladding light that includes NAs that are less than or equal to the maximum selected NA for the cladding light after the cladding light propagates through the cladding light stripper.

FIGS. 2A-2C are provided as an example. Other examples may differ from what is described with regard to FIGS. 2A-2C.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations may not be combined.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A cladding light stripper, comprising:
an optical fiber that includes a core and an exterior cladding; and
a light removal component, wherein:
the exterior cladding circumferentially surrounds the core of the optical fiber,
the exterior cladding includes a first portion, a second portion, and an intermediate portion disposed between the first portion and the second portion,
the intermediate portion is bidirectionally tapered,
the light removal component is disposed on one or more regions of a central section of the intermediate portion,
cladding light is to propagate within the exterior cladding,
a maximum numerical aperture (NA) associated with a threshold percentage of the cladding light within the first portion is greater than a maximum selected NA, and
a maximum NA associated with the threshold percentage of the cladding light within the second portion is less than or equal to the maximum selected NA.

2. The cladding light stripper of claim 1, wherein the intermediate portion includes a first section, a second section, and the central section disposed between the first section and the second section, wherein:
the first section is tapered;
the second section is reverse-tapered; and
the central section is not tapered.

3. The cladding light stripper of claim 1, wherein the intermediate portion further includes a first section and a second section, wherein:
the first section is tapered according to a first taper ratio; and
the second section is reverse-tapered according to a second taper ratio.

4. The cladding light stripper of claim 3, wherein the first taper ratio matches the second taper ratio.

5. The cladding light stripper of claim 3, wherein:
the first section is adiabatically tapered; and
the second section is adiabatically tapered.

6. The cladding light stripper of claim 1, wherein the light removal component has a NA, and wherein another section of the intermediate portion is tapered according to a taper ratio that is associated with the NA of the light removal component.

7. The cladding light stripper of claim 6, wherein the taper ratio is equal to the maximum selected NA divided by the NA of the light removal component.

8. The cladding light stripper of claim 1, wherein:
the first portion is configured to propagate the cladding light to a first section of the intermediate portion,
wherein the cladding light has a NA distribution, and
wherein a portion of the cladding light is associated with NAs that are greater than the maximum selected NA;
the first section is configured to change the NA distribution of the cladding light and to propagate the cladding light to the central section,
wherein the first section is configured to cause the portion of the cladding light to be associated with NAs that are greater than an NA of the light removal component,
the central section is configured to propagate the cladding light to a second section of the intermediate portion;
the light removal component is configured to remove greater than a first threshold percentage of the portion of the cladding light as the cladding light propagates to the second section; and
the second section is configured to change the NA distribution of the cladding light and to propagate the cladding light to the second portion,
wherein the second section is configured to cause a maximum NA of a second threshold percentage of the cladding light to be less than or equal to the maximum selected NA.

9. The cladding light stripper of claim 8, wherein the first threshold percentage and the second threshold percentage are each greater than or equal to 99.5%.

10. A cladding light stripper, comprising:
an optical fiber; and
a light removal component, wherein:
an exterior cladding of the optical fiber surrounds a core of the optical fiber,
the exterior cladding includes a first portion, a second portion, and an intermediate portion disposed between the first portion and the second portion,
the intermediate portion includes a first section that is tapered, a second section that is reverse-tapered, and a central section disposed between the first portion and the second portion,
the light removal component is disposed on one or more regions of the central section of the intermediate portion,
cladding light is to propagate within the exterior cladding,
a maximum numerical aperture (NA) associated with a threshold percentage of the cladding light within the first portion is greater than a maximum selected NA, and
a maximum NA associated with the threshold percentage of the cladding light within the second portion is less than or equal to the maximum selected NA.

11. The cladding light stripper of claim 10, wherein:
the first section of the intermediate portion is tapered according to a first taper ratio; and
the second section of the intermediate portion is reverse-tapered according to a second taper ratio that does not match the first taper ratio.

12. The cladding light stripper of claim 10, wherein:

the first section of the intermediate portion is tapered according to a first taper ratio; and the second section of the intermediate portion is reverse-tapered according to a second taper ratio that matches the first taper ratio.

13. The cladding light stripper of claim 10, wherein the first section is tapered and the second section is reverse-tapered according to a taper ratio that is associated with a NA of the light removal component.

14. The cladding light stripper of claim 13, wherein the taper ratio is equal to the maximum selected NA divided by the NA of the light removal component.

15. A cladding light stripper, comprising:

an optical fiber; and a light removal component, wherein:

an intermediate portion of an exterior cladding of the optical fiber includes a first section that is tapered and a second section that is tapered, the light removal component is disposed on one or more regions of a non-tapered section of the intermediate portion, cladding light is to propagate within the exterior cladding, a maximum numerical aperture (NA) associated with a threshold percentage of the cladding light within a first portion of the exterior cladding is greater than a maximum selected NA, a maximum NA associated with the threshold percentage of the cladding light within a second portion of the exterior cladding is less than or equal to the maximum selected NA, and wherein the intermediate portion is between the first portion and the second portion.

16. The cladding light stripper of claim 15, wherein:

the first section and the second section are respectively tapered according to different taper ratios.

17. The cladding light stripper of claim 15, wherein:

the first section of the intermediate portion is tapered according to a first taper ratio; and the second section of the intermediate portion is tapered according to a second taper ratio that matches the first taper ratio.

18. The cladding light stripper of claim 15, wherein the cladding light is to propagate within the exterior cladding via the intermediate portion from an input end of the cladding light stripper to an output end of the cladding light stripper, wherein:

a maximum NA associated with the cladding light at the input end of the cladding light stripper is greater than the maximum selected NA; and a maximum NA associated with 99.5% of the cladding light at the output end of the cladding light stripper is less than or equal to the maximum selected NA.

19. The cladding light stripper of claim 15, wherein each of the first section and the second section of the intermediate portion is tapered according to a taper ratio that is associated with a NA of the light removal component.

20. The cladding light stripper of claim 19, wherein the taper ratio is equal to the maximum selected NA divided by the NA of the light removal component.

* * * * *